US008819218B2

(12) United States Patent
Candelaria et al.

(10) Patent No.: US 8,819,218 B2
(45) Date of Patent: Aug. 26, 2014

(54) APPARATUS, SYSTEM, AND METHOD FOR DEVICE LEVEL ENABLEMENT OF A COMMUNICATIONS PROTOCOL

(75) Inventors: Susan K. Candelaria, Tucson, AZ (US);
Roger G. Hathorn, Tucson, AZ (US);
Matthew J. Kalos, Tucson, AZ (US);
Beth Peterson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 12/565,995

(22) Filed: Sep. 24, 2009

(65) Prior Publication Data

US 2011/0072153 A1    Mar. 24, 2011

(51) Int. Cl.
*G06F 15/173* (2006.01)
*G06F 15/16* (2006.01)
*G06F 11/30* (2006.01)
*G21C 17/00* (2006.01)
*H04L 1/24* (2006.01)
*H04L 12/26* (2006.01)
*H04L 29/06* (2006.01)

(52) U.S. Cl.
CPC .............. *H04L 1/244* (2013.01); *H04L 43/50* (2013.01); *H04L 69/18* (2013.01); *H04L 69/24* (2013.01)
USPC ............ 709/224; 709/223; 709/237; 702/186

(58) Field of Classification Search
CPC ..... H04L 12/26; H04L 1/244; H04L 12/2697; H04L 69/18; H04L 69/24
USPC ......................................... 709/237
See application file for complete search history.

(56) References Cited

U.S. PATENT DOCUMENTS

| 7,886,031 | B1 * | 2/2011 | Taylor et al. .................. 709/221 |
| 8,196,149 | B2 | 6/2012 | Ricci et al. |
| 2004/0015622 | A1 * | 1/2004 | Avery .............................. 710/22 |
| 2004/0260981 | A1 * | 12/2004 | Kitamorn et al. ............... 714/43 |
| 2005/0018673 | A1 | 1/2005 | Dropps et al. |
| 2005/0163168 | A1 | 7/2005 | Sheth et al. |
| 2005/0193059 | A1 | 9/2005 | Dellacona |
| 2006/0031519 | A1 * | 2/2006 | Helliwell et al. ............. 709/227 |
| 2006/0034309 | A1 | 2/2006 | Saklecha et al. |
| 2008/0022272 | A1 * | 1/2008 | Komano ........................ 717/170 |
| 2009/0077285 | A1 * | 3/2009 | Isobe et al. ....................... 710/74 |

* cited by examiner

*Primary Examiner* — Tom Y Chang
(74) *Attorney, Agent, or Firm* — Kunzler Law Group

(57) ABSTRACT

An apparatus, system, and method are disclosed for device level enablement of a communications protocol. An adapter compatibility module determines an adapter compatibility status for a plurality of host adapters. A positive adapter compatibility status indicates that each host adapter in the plurality of host adapters is compatible with a communications protocol. A processor compatibility module determines a processor compatibility status for one or more processors. The one or more processors coordinate data transfers to and from the plurality of host adapters. A positive processor compatibility status indicates that each of the one or more processors is compatible with the communications protocol. A compatibility summary module determines a compatibility summary for the plurality of host adapters and the one or more processors. The compatibility summary indicates a positive compatibility relative to the communications protocol in response to a positive processor compatibility status and a positive adapter compatibility status.

25 Claims, 6 Drawing Sheets

APPARATUS, SYSTEM, AND METHOD FOR DEVICE LEVEL ENABLEMENT OF A COMMUNICATIONS PROTOCOL

FIELD

This invention relates to device level protocol enablement and more particularly relates to device level enablement of a communications protocol.

BACKGROUND

Description of the Related Art

Carefully defined communications protocols provide efficient, reliable, communications. As data is increasingly being stored and transmitted electronically, communications protocols are likewise becoming increasingly important. Communications protocols determine the amount of data that can be transmitted over a communications channel, and the speed that data is transmitted. Communications protocols can also either cause data loss and data corruption, or prevent them.

Communications protocols may be updated to increase transmission speed, throughput, reliability, and other issues. New protocols may also add additional features to existing protocols. As communications devices are updated for compatibility with new communications protocols, communications are often in mixed environments, with some devices that are compatible with a new communications protocol and others that are not. Even when an entire group of communications devices are updated for compatibility with a protocol, an update may fail or be interrupted on an individual device, leaving the device incompatible with the protocol.

Additionally, many communications protocols allow for multiple communications paths between devices. Certain communications paths between the same two communications devices may be compatible with a communications protocol, while other communications paths between the two devices are incompatible. Even within a single communications device, some individual components may be compatible with a communications protocol while other individual components are not. This is especially true for distributed communications protocols that involve multiple distributed communications devices.

BRIEF SUMMARY

From the foregoing discussion, it should be apparent that a need exists for an apparatus, system, and method that determine compatibility relative to a communications protocol. Beneficially, such an apparatus, system, and method would determine compatibility for a plurality of distributed communications devices.

The present invention has been developed in response to the present state of the art, and in particular, in response to the problems and needs in the art that have not yet been fully solved by currently available compatibility determinations. Accordingly, the present invention has been developed to provide an apparatus, system, and method for device level enablement of a communications protocol that overcome many or all of the above-discussed shortcomings in the art.

The apparatus for device level enablement of a communications protocol is provided with a plurality of modules configured to functionally execute the necessary steps of determining device level compatibility with the communications protocol. These modules in the described embodiments include an adapter compatibility module, a processor compatibility module, a compatibility summary module, a status message module, a code update module, and a summary update module.

In one embodiment, the adapter compatibility module determines an adapter compatibility status for a plurality of host adapters. A positive adapter compatibility status, in a further embodiment, indicates that each host adapter in the plurality of host adapters is compatible with a communications protocol.

In one embodiment, the processor compatibility module determines a processor compatibility status for one or more processors. The one or more processors, in one embodiment, coordinate data transfers to and from the plurality of host adapters. In a further embodiment, a positive processor compatibility status indicates that each of the one or more processors is compatible with the communications protocol.

In one embodiment, the compatibility summary module determines a compatibility summary for the plurality of host adapters and the one or more processors. The compatibility summary, in a further embodiment, indicates a positive compatibility relative to the communications protocol in response to a positive processor compatibility status and a positive adapter compatibility status.

In one embodiment, the status message module provides the compatibility summary to each host adapter in the plurality of host adapters. In a further embodiment, each of the plurality of host adapters is configured to transmit the compatibility summary over a communications channel.

The status message module, in one embodiment, provides the compatibility summary to each host adapter in the plurality of host adapters using an internal message delivery system. In another embodiment, the status message module provides the compatibility summary to each host adapter in the plurality of host adapters using a peripheral component interconnect write operation that writes the compatibility summary to a host adapter. In a further embodiment, the status message module provides the compatibility summary to each host adapter in the plurality of host adapters using a direct memory access write operation that writes the compatibility summary to a host adapter.

In one embodiment, the code update module updates one or more host adapters from the plurality of host adapters such that the one or more host adapters are compatible with the communications protocol. In a further embodiment, the one or more host adapters report a positive compatibility with the communications protocol to the adapter compatibility module in response to the update.

In one embodiment, the summary update module updates the compatibility summary in response to a change in the adapter compatibility status. The change in the adapter compatibility status, in one embodiment, comprises an addition of a host adapter to the plurality of host adapters that is incompatible with the communications protocol.

In one embodiment, the compatibility summary comprises one or more compatibility flags. Each of the plurality of host adapters, in a further embodiment, is configured to transmit the one or more compatibility flags over a communications channel during a handshake procedure. In another embodiment, the handshake procedure comprises a fibre process login procedure, and each of the plurality of host adapters are configured to transmit the one or more compatibility flags over the communications channel in a process login response.

In one embodiment, the one or more processors comprise at least two groups of symmetric multiprocessors. In a further embodiment, each group of symmetric multiprocessors reports a group compatibility status to the processor compatibility module. Each group of symmetric multiprocessors, in another embodiment, comprises a central electronic complex that coordinates data transfers between the plurality of host adapters and one or more data storage devices.

In one embodiment, each host adapter in the plurality of host adapters comprises a fibre channel host adapter. In a further embodiment, the communications protocol comprises a fibre channel extension protocol that comprises an additional feature over an existing fibre channel protocol, and the communications channel comprises a fibre communications channel.

A system of the present invention is also presented for device level enablement of a communications protocol. The system may be embodied by a plurality of host adapters, one or more processors, and a protocol compatibility module. In particular, the protocol compatibility module, in one embodiment, is substantially similar to the apparatus described above. In another embodiment, the system may further include one or more data storage repositories.

A computer program product, a method, and an additional system of the present invention are also presented for device level enablement of a communications protocol. The computer program product, the method, and the additional system in the disclosed embodiments substantially include the modules and steps necessary to carry out the functions presented above with respect to the operation of the described apparatus and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
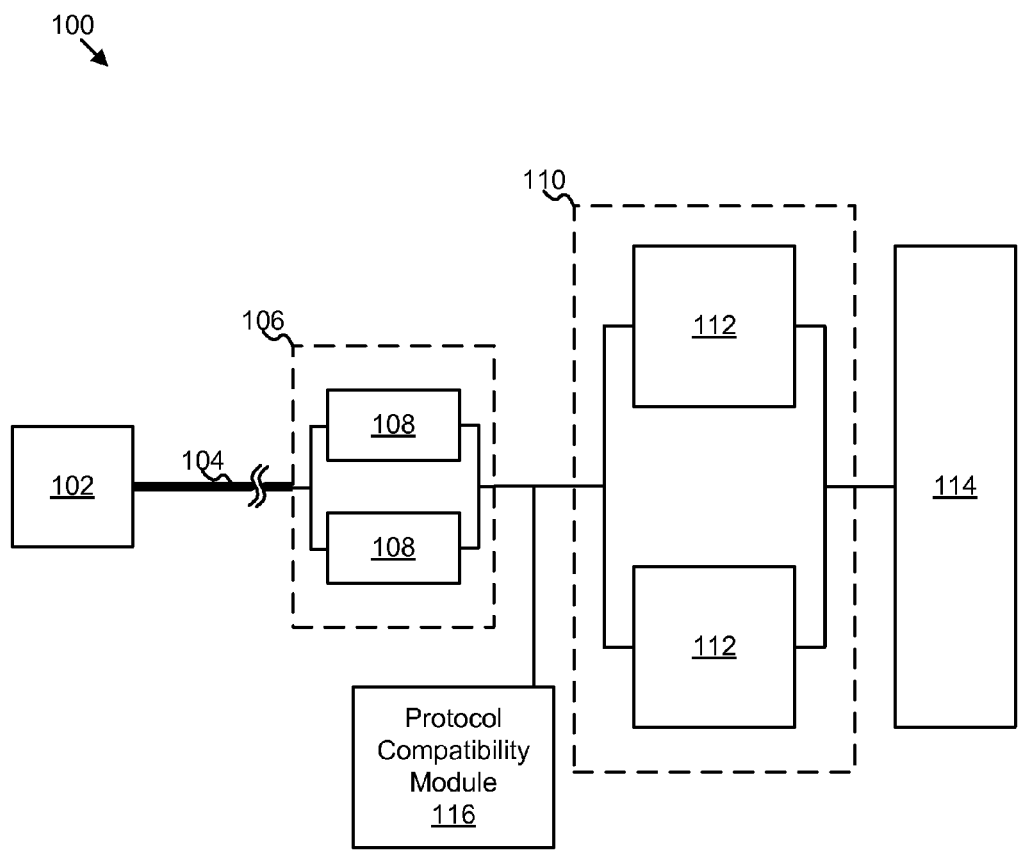
FIG. 1 is a schematic block diagram illustrating one embodiment of a system for device level enablement of a communications protocol in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a system 100 for device level enablement of a communications protocol. In general, the system 100 determines whether multiple sets of devices are compatible with a distributed communications protocol. A distributed communications protocol, as used herein, is a protocol that is implemented using a series of devices or components, each of which may have an individual compatibility with the distributed communications protocol.

Because the distributed communications protocol involves a series of devices, or multiple sets of devices, a single incompatible device or component can render an entire system incompatible with the distributed communications protocol. The distributed communications protocol may be an original protocol, or an extension protocol that has additional features over an existing communications protocol. An extension protocol, in one embodiment, may be new, and may not have widespread device compatibility.

Devices and components involved in a communications protocol are compatible with the communications protocol if they have the software and/or hardware to validly implement the communications protocol. Implementing the communications protocol may involve compatible message formats, timing, synchronization, shared libraries, handshakes, or other aspects of communications. In the depicted embodiment, the system 100 comprises a communications device 102, a communications channel 104, a plurality of host adapters 106, one or more processors 110, a host device 114, and a protocol compatibility module 116.

In one embodiment, the communications device 102 is a device that is compatible with a communications protocol, and that is capable of communicating using the communications protocol over the communications channel 104. The communications device 102 may be a part of the system 100, or may be external to the system 100. The communications device 102 may comprise a computing device, a channel subsystem, a controller, a processor, a router, a switch, a host adapter, or another device compatible with the communications protocol. In the depicted embodiment, the communications device 102 is in communication with the plurality of host adapters 106 over the communications channel 104.

The communications channel 104 may comprise a digital or analog channel, a multiplexed channel, a simplex or duplex channel, an uplink or downlink channel, a parallel or series communications bus, and/or another type of communications channel. The communications channel 104 may comprise a wired transmission medium, such as fibre optic lines, copper wires, or the like, or may comprise a wireless transmission medium. The communications channel 104 may comprise a single communications channel or a plurality of communications channels. The communications channel 104, in a further embodiment, may comprise one or more channel subsystems to facilitate communications between the communications device 102 and the plurality of host adapters 106.

In one embodiment, each host adapter 108 from the plurality of host adapters 106 sends and receives data over the communications channel 104. Each host adapter 108, in one embodiment, may comprise an Input/Output ("I/O") adapter, a device adapter, a network card, a host controller, a host bus adapter, a network adapter, a network interface controller, a network interface card, a control unit, a communications controller, a modem, a memory controller, or another device that sends and receives electronic data. In another embodiment, the communications device 102 may be capable of communicating with multiple host adapters 108 from the plurality of host adapters 106, such that there are multiple communications paths between the communications device 102 and the host device 114.

The communications device 102, in one embodiment, may request a compatibility status relative to the communications protocol from a host adapter 108 to facilitate communications between the communications device 102 and the host device 114 using the communications protocol. The communications device 102 may make a request as part of a handshake procedure with a host adapter 108. For example, in one embodiment, the communications device 102 may send a request to a host adapter 108 indicating support for the communications protocol, and the host adapter 108 may send a response or acknowledgement to the communications device 102 indicating compatibility or incompatibility with the communications protocol. As described below with regard to the protocol compatibility module 116, each host adapter 108 may indicate to the communications device 102 a compatibility for the system 100, representing a compatibility or incompatibility of each communications path between the communications device 102 and the host device 114.

In one embodiment, the one or more processors 110 coordinate data transfers to and from the plurality of host adapters 106. In the depicted embodiment, the one or more processors 110 coordinate data transfers between the plurality of host adapters 106 and the host device 114. Each processor 112 may comprise a processor, such as an x86 processor or a Reduced Instruction Set Computer ("RISC") processor, a controller or microcontroller, a programmable hardware device, an Application Specific Integrated Circuit ("ASIC"), a Symmetric MultiProcessor (SMP), a processor core, or the like. Each host adapter 108 may be in communication with each processor 112 from the one or more processors 110, or may be assigned to a specific processor 112 or set of processors 112.

In one embodiment, each processor 112 may be individually compatible or incompatible with the communications protocol. The one or more processors 110, in another embodiment, further increase the number of available communications paths between the communications device 102 and the host device 114, because each processor 112 may coordinate data transfers for multiple host adapters 108. Because each host adapter 108 and each processor 112 may be individually compatible or incompatible with the communications protocol, certain communications paths between the communications device 102 and the host device 114 may be compatible with the communications protocol while other communications paths may be incompatible.

In one embodiment, the host device 114 comprises a source of communications to and from the plurality of host adapters 106. The host device 114, in a further embodiment, may comprise a computing device, a communications device, one or more data storage repositories, or the like. For example, the host device 114 may comprise a desktop computer, a network server, a portable computing device, a telephony system, a storage array, or the like. In one embodiment, the plurality of host adapters 106 and/or the one or more processors 110 are installed on or integrated with the host device 114.

The host device 114 may comprise a passive device that the one or more processors 110, or a separate controller or processor, manage, or the host device 114 may manage the one or more processors 110 and/or the plurality of host adapters 106. For example, in one embodiment, the host device 114 may comprise a passive data storage repository in which the one or more processors 110 store and retrieve data for communications using the plurality of host adapters 106. In another embodiment, the host device 114 may comprise a computer, and the one or more processors 110 and the plurality of host adapters 106 may provide communications for the computer in response to commands from the computer. In a further embodiment, the host device 114 may comprise a computing device, and the one or more processors 110 and the plurality of host adapters 106 may comprise subcomponents of the host device 114.

In one embodiment, the protocol compatibility module 116 determines a compatibility summary for the plurality of host adapters 106 and the one or more processors 110. The compatibility summary indicates a compatibility status of the system 100 relative to the communications protocol. The protocol compatibility module 116 is described in greater detail with regard to FIG. 3 and FIG. 4. The protocol compatibility module 116 may comprise an independent module or the protocol compatibility module 116 may be integrated with the one or more processors 110, the plurality of host adapters 106, and/or the host device 114.

In one embodiment, the compatibility summary indicates a positive compatibility relative to the communications protocol in response to each of the plurality of host adapters 106 and each of the one or more processors 110 having a positive compatibility status relative to the communications protocol. If each of the plurality of host adapters 106 and each of the one or more processors 110 are compatible with the communications protocol, then each communications path between the communications device 102 and the host device 114 is also compatible with the communications protocol.

The protocol compatibility module 116, in one embodiment, may provide the compatibility summary to each host adapter 108. By providing each host adapter 108 with the compatibility summary, each host adapter 108, if queried by the communications device 102 for a compatibility status relative to the communications protocol, may transmit the compatibility summary over the communications channel 104 to the communications device 102, providing the communications device 102 with a compatibility status of the system 100. The compatibility summary provides each host adapter 108 with information beyond their individual compatibilities, such that each host adapter 108 can provide an accurate and complete system compatibility status, even if an individual host adapter 108 is not in communication with or even aware of other components of the system 114.

Figure 2:
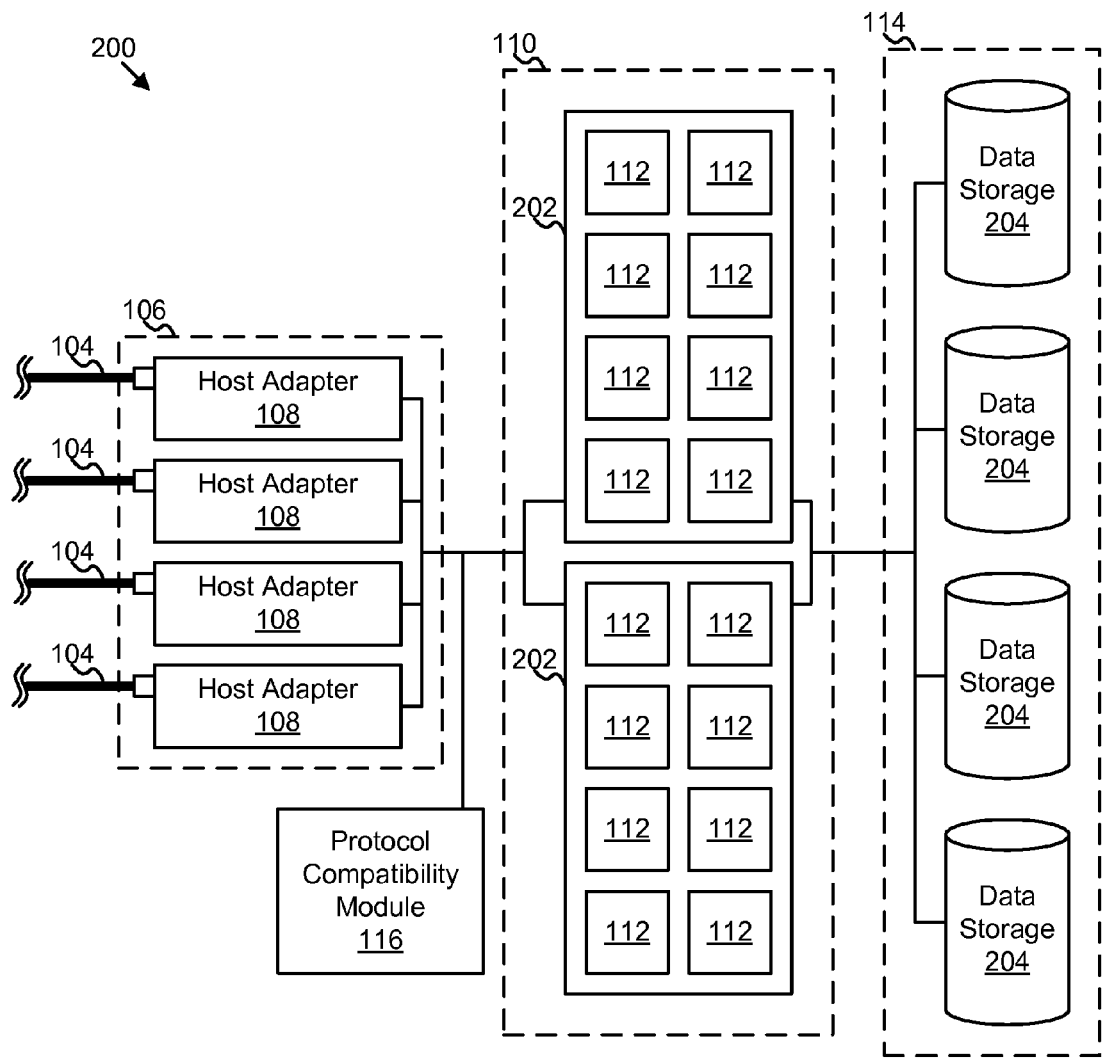
FIG. 2 is a schematic block diagram illustrating another embodiment of a system for device level enablement of a communications protocol in accordance with the present invention.

FIG. 2 depicts one embodiment of a system 200 for device level enablement of a communications protocol. In one embodiment, the system 200 is substantially similar to the system 100 described above. In the depicted embodiment, the system 200 comprises a plurality of communications channels 104, a plurality of host adapters 106, one or more processors 110, a host device 114, and the protocol compatibility module 116.

In one embodiment, the plurality of communications channels 104 comprises fibre communications channels, and the plurality of host adapters 106 comprises fibre channel host adapters. A host adapter 108 may comprise a control unit that makes a connection with a channel 104 through a channel subsystem, such as the communications device 102 of FIG. 1, or a channel subsystem disposed between the host adapter 108 and the communications device 102. A host adapter 108, in one embodiment, may transmit a compatibility summary to a channel subsystem during a handshake procedure. In one embodiment, the compatibility summary may comprise one or more compatibility flags. A compatibility flag is an identifier, such as a bit or series of bits, that indicates compatibility or incompatibility with a communications protocol.

The handshake procedure, in one embodiment, comprises a fibre Process Login ("PRLI") procedure. During the PRLI procedure, a host adapter 108 may respond to a channel PRLI message that indicates channel compatibility with the communications protocol by sending a PRLI response indicating whether the system 200 is compatible with the communications protocol. In one embodiment, the communications protocol comprises a fibre channel extension protocol that adds one or more additional features to an existing fibre channel protocol.

For example, one extension protocol that adds features to the Fibre Connectivity ("FICON") protocol is the High Performance FICON for System z ("zHPF") protocol. Both FICON and zHPF are developed by International Business Machines Corp. of Armonk, N.Y. ("IBM") for IBM's System z platform. The zHPF extension protocol reduces channel overhead compared to the existing FICON protocol by reducing the number of Channel Command Words ("CCWs") and Information Units ("IUs"). The zHPF extension protocol is a distributed communications protocol, as described above, and is implemented with a compatible channel 104, a compatible host adapter 108, and a compatible storage subsystem, such as the one or more processors 110.

In the depicted embodiment, the host device 114 comprises one or more data storage repositories 204, and the one or more processors 110 comprise a storage subsystem that coordinates data transfers between the plurality of host adapters 106 and the one or more data storage repositories 204. In a further embodiment, the one or more processors 110 comprise two or more groups of processors 202. Each group of processors 202, in one embodiment, comprises a Central Electronic Complex ("CEC"). In another embodiment, each group of processors 202, or CEC, may comprise one or more processors 112. Each processor 112 may comprise an SMP, an SMP core, or another type of processor as described above. Multiple processors 112 may share memory, balance workload, and the like within a group 202.

Each group of processors 112, in one embodiment, may comprise a protocol compatibility module 116 or a portion of a protocol compatibility module 116. For example, each group of processors 112 may maintain a compatibility summary. In an embodiment where the one or more processors 110 comprises a single group of processors 202, or a single cluster configuration, the compatibility summary may indicate a compatibility status for the group of processors 202 and each host adapter 108.

In an embodiment where the one or more processors 110 comprises two groups of processors 202, or a dual cluster configuration, or more groups of processors 202, each group of processors 202 may maintain separate compatibility summaries that indicate a compatibility status for each group of processors 202 and for each host adapter 108. Each group of processors 202 may further communicate a group compatibility status to other groups of processors 202. By maintaining multiple compatibility statuses, each processor 112 or group of processors 202 may provide the compatibility status to a host adapter 108, and the redundancy further provides added accuracy and reliability.

In one embodiment, the one or more storage repositories 204 comprise data storage hardware, such as magnetic drives, optical drives, solid state drives, and the like. In a further embodiment, the one or more storage repositories 204 comprise data storage software, such as databases, file shares, data structures, or other software data storage repositories. Individual data storage repositories 204 may be assigned to a specific processor 112, or group of processors 202, for example even and odd numbered data storage repositories 204 may be assigned to different groups of processors 202, or the like. In a further embodiment, the one or more storage repositories 204 may be organized in Logical SubSystems ("LSSs") or the like, and may be accessible as LSSs.

Figure 3:
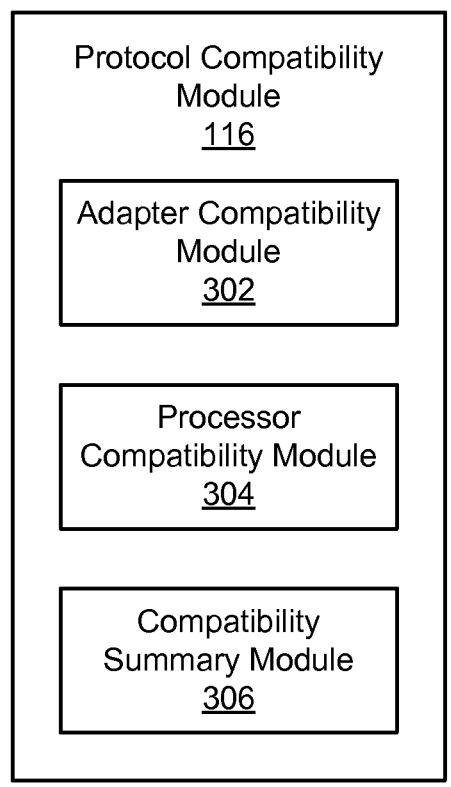
FIG. 3 is a schematic block diagram illustrating one embodiment of a protocol compatibility module in accordance with the present invention.

FIG. 3 depicts one embodiment of the protocol compatibility module 116. In the depicted embodiment, the protocol compatibility module 116 comprises an adapter compatibility module 302, a processor compatibility module 304, and a compatibility summary module 306.

In one embodiment, the adapter compatibility module 302 determines an adapter compatibility status for the plurality of host adapters 106. A positive adapter compatibility status, in one embodiment, indicates that each host adapter 108 in the plurality of host adapters 106 is compatible with the communications protocol. Otherwise the adapter compatibility status indicates an incompatibility with the communications protocol.

A host adapter 108 may report a compatibility to the adapter compatibility module 302, upon upgrading to compatibility with the communications protocol or the like, or the adapter compatibility module 302 may determine a compatibility for a host adapter 108 by polling the host adapter 108, testing compatibility of the host adapter 108, or the like. The adapter compatibility module 302, in one embodiment, determines an incompatible compatibility status in response to one or more of the host adapters 108 not reporting compatibility at all, or reporting an incompatibility with the communications protocol.

In a further embodiment, a host adapter 108 may be compatible with the communications protocol based on one or more hardware or software attributes or identifiers associated with the communications protocol. For example, a version of code, a shared library, a hardware version, or the like may indicate compatibility with the communications protocol. Indicators of these and other attributes may be available to the adapter compatibility module 302 through a query to a host adapter 108, commonly accessible data storage, a message from a host adapter 108, or the like.

In one embodiment, the adapter compatibility module 302 may maintain a data structure, such as a table, array, list, set, or the like, with a compatibility status for each host adapter 108. The adapter compatibility module 302 may use a boolean to represent compatibility, or another compatibility identifier. In a further embodiment, the adapter compatibility module 302 may send an overall adapter compatibility status or individual adapter compatibility statuses to the compatibility summary module 306, or may store them in a location accessible to the compatibility summary module 306.

In one embodiment, the processor compatibility module 304 determines a processor compatibility status for the one or more processors 110. A positive processor compatibility status, in one embodiment, indicates that each processor 112 or group of processors 202 in the one or more processors 110 is compatible with the communications protocol. Otherwise, the processor compatibility status indicates an incompatibility with the communications protocol.

A processor 112 or group of processors 202 may report a compatibility to the processor compatibility module 304, upon upgrading to compatibility with the communications protocol or the like, or the processor compatibility module 304 may determine a compatibility for a processor 112 by polling the processor 112, testing compatibility of the processor 112, or the like. In one embodiment, each group of processors 202 determines a group processor compatibility, and reports the group processor compatibility to the processor compatibility module 304. Each group of processors 202, in a further embodiment, may report the group processor compatibility to each other group of processors 202.

In one embodiment, a processor 112 or group of processors 202 may be compatible with the communications protocol based on one or more hardware or software attributes or identifiers associated with the communications protocol. For example, as with the plurality of host adapters 106, a version of code, a shared library, a hardware version, or the like may indicate compatibility with the communications protocol. Indicators of these and other attributes may be available to the processor compatibility module 304 through a query to a processor 112 or group of processors 202, commonly accessible data storage, a message from a processor 112 or group of processors 202, or the like.

In one embodiment, the processor compatibility module 304 may maintain a data structure, such as a table, array, list, set, or the like, with a compatibility status for each processor 112 or group of processors 202. The processor compatibility module 304 may use a boolean to represent compatibility, or another compatibility identifier. In a further embodiment, the processor compatibility module 304 may send an overall processor compatibility status or individual processor compatibility statuses to the compatibility summary module 306, or may store them in a location accessible to the compatibility summary module 306.

In one embodiment, the compatibility summary module 306 determines a compatibility summary for the plurality of host adapters 106 and the one or more processors 110. The compatibility summary, in a further embodiment, indicates a positive compatibility relative to the communications protocol in response to a positive processor compatibility status from the processor compatibility module 304 and a positive adapter compatibility status from the adapter compatibility module 302.

As described above, the adapter compatibility module 302 and the processor compatibility module 304 may report the adapter compatibility status and the processor compatibility status to the compatibility summary module 306, may store them in data storage accessible to the compatibility summary module 306, or the like. The adapter compatibility module 302 and the processor compatibility module 304 may use an internal message processing and delivery system to send the compatibility statuses to the compatibility summary module 306, may use a Peripheral Component Interconnect ("PCI") write operation or a Direct Memory Access ("DMA") write operation to write the compatibility statuses to data storage accessible to the compatibility summary module 306, or may otherwise communicate the compatibility statuses to the compatibility summary module 306.

An internal message processing and delivery system, in one embodiment, may be implemented by the one or more processors 110, the protocol compatibility module 114, or other components. For example, in one embodiment, a host adapter 108, a processor 112, a module, or another component may send a message to the internal message processing and delivery system with an identifier or address of a target component, such as a host adapter 108, a processor 112, a module, or the like, and the internal message processing and delivery system may send the message to the target component, alert the target component of a location of the message, or the like.

In one embodiment, a shared library or the like associated with the communications protocol may define message formats for the compatibility summary, the compatibility statuses, and/or other messages between modules, the plurality of host adapters 106, and/or the one or more processors 110. In a further embodiment, the shared library or the like may be available or usable to a host adapter 108 or a processor 112 that is compatible with the communications protocol, and unavailable or unusable to a host adapter 108 or a processor 112 that is incompatible with the communications protocol.

The compatibility summary that the compatibility summary module 306 determines may comprise one or more compatibility flags or other compatibility indicators. The compatibility summary may comprise a general overall system compatibility, such as a single compatibility flag or the like, or may comprise specific compatibilities for system components, such as a plurality of compatibility flags for each host adapter 108 and processor 112, or compatibility flags for groups of components. The compatibility summary may comprise one or more data structures to organize the compatibility indicators, such as a table, array, list, set, or the like.

In another embodiment, the compatibility summary may comprise separate compatibility indicators for different aspects of the communications protocol, or for different communications protocols. The compatibility summary module 306, in a further embodiment, may maintain a plurality of compatibility summaries having different scopes, such as a summary of each individual host adapter 108 and processor 112 and a general system-wide summary.

As discussed above, the compatibility summary module 306 may be installed on, integrated with, or otherwise in communication with the plurality of host adapters 106, the one or more processors 110, and/or the host device 114. For example, the one or more processors 110, in one embodiment, may comprise the compatibility summary module 306, and may determine the compatibility summary. In one embodiment, one or more separate processors 112 or groups of processors 112 may each comprise a summary module 306, and may each maintain separate compatibility summaries, such that each processor 112 or group of processors 202 may make a compatibility summary available to a host adapter 108, another processor 112 or group of processors 202, or the like.

Figure 4:
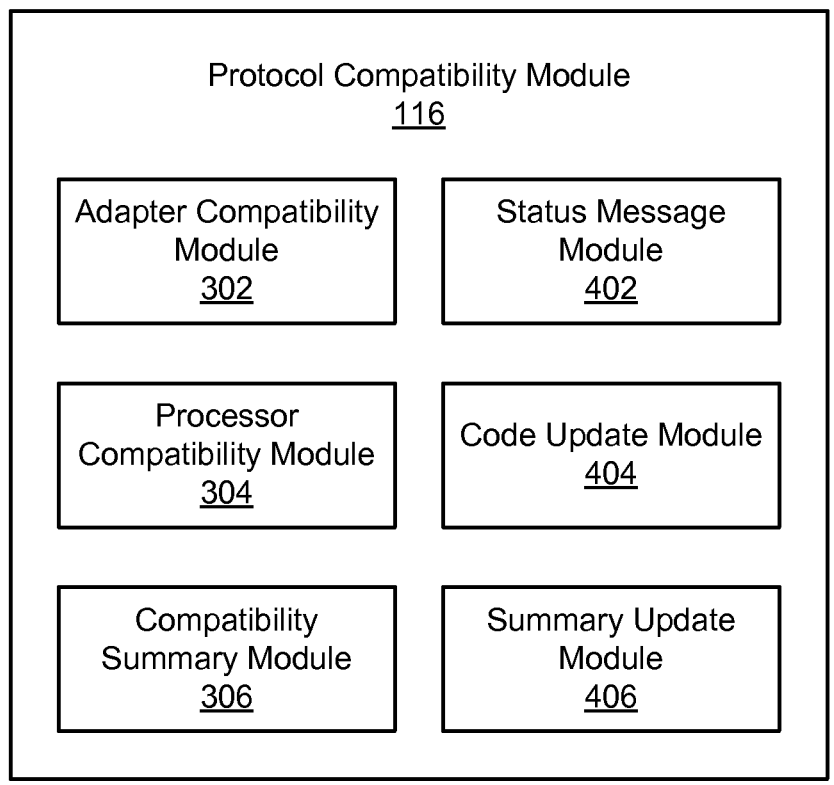
FIG. 4 is a schematic block diagram illustrating another embodiment of a protocol compatibility module in accordance with the present invention.

FIG. 4 depicts another embodiment of the protocol compatibility module 116. In the depicted embodiment, the protocol compatibility module 116 comprises the adapter compatibility module 302, the processor compatibility module 304, and the compatibility summary module 306 as described above, and further comprises a status message module 402, a code update module 404, and a summary update module 406 described below.

In one embodiment, the status message module 402 provides the compatibility summary from the compatibility summary module 306 to each host adapter 108 in the plurality of host adapters 106. As described above, each host adapter 108 may transmit the compatibility summary, comprising a compatibility status, a compatibility flag, or the like, over the communications channel 104 to the communications device 102, indicating compatibility or incompatibility with the communications protocol.

The status message module 402, in a further embodiment, may provide the compatibility summary to each host adapter 108 using an internal message processing and delivery system, using a PCI write operation, using a DMA write operation, or the like, as described above. The status message module 402 may write the compatibility summary to data storage installed on a host adapter 108, to data storage available to one or more host adapters 108, or the like. In a further embodiment, the status message module 402 may provide the compatibility summary to each host adapter 108 by updating one or more status registers, status bits, or the like for each host adapter 108. In another embodiment, data storage space is allocated on each host adapter 108, or in data storage accessible to each host adapter 108, for the compatibility summary. As described above, the compatibility summary may comprise a single bit, a sequence of bits, a data structure, a message, or may have another format.

By providing the compatibility summary to each host adapter 108, the status message module 402 allows each host adapter 108 to represent to the communications device 102 a general compatibility of each communications path from the communications device 102 to the host device 114. Because the compatibility summary, in one embodiment, indicates a positive compatibility relative to the communications protocol in response to each host adapter 108 and each processor 112 having a positive compatibility with the communications protocol, once a host adapter 108 confirms compatibility with the communications protocol to the communications device 102, the communications device 102 can use the communications protocol in that transaction and in subsequent transactions, even with a different host adapter 108, and even with a different processor 112 coordinating the transaction.

In one embodiment, the code update module 404 updates one or more host adapters 108 and/or processors 112 such that they are compatible with the communications protocol. The code update module 404 may update the one or more host adapters 108 and/or processors 112 as part of a scheduled update process, or in response to a determined incompatibility. The code update module 404 may update microcode, firmware, software, a shared library, or the like such that the one or more host adapters 108 and/or processors 112 are compatible with the communications protocol.

The code update module 404, in another embodiment, may report a successful update and compatibility of the one or more host adapters 108 and/or processors 112 to the adapter compatibility module 302 and/or to the processor compatibility module 304. In a further embodiment, the code update module 404 may cause the one or more host adapters 108 and/or processors 112 to report a compatibility to the adapter compatibility module 302 and/or to the processor compatibility module 304 in response to a successful update.

In another embodiment, the code update module 404 may notify a user, another module, or the like of a determined incompatibility. The code update module 404 may provide the user, the other module, or the like, an option to update the one or more host adapters 108 and/or processors 112. The code update module 404 may update the one or more host adapters 108 and/or processors 112 in response to input from a user, another module, or the like.

In one embodiment, the summary update module 406 updates the compatibility summary in response to a change in the adapter compatibility status or the processor compatibility status. A change in the adapter compatibility status or the processor compatibility status may occur in response to an addition or installation of a compatible or incompatible host adapter 108, processor 112, group of processors 202, or the like.

A change in the adapter compatibility status or the processor compatibility status may further occur in response to an installation of a compatible or incompatible microcode, firmware, software, shared library, or the like on an existing host adapter 108, processor 112, group of processors 202, or the like. The change in the adapter compatibility status or the processor compatibility status may be a change from incompatibility to compatibility, or a change from compatibility to incompatibility.

The summary update module 406, in one embodiment, may update an individual compatibility status in the compatibility summary in response to a change in compatibility of a host adapter 108 or a processor 112. In a further embodiment, the summary update module 406 may update a general compatibility status in response to a change in compatibility.

The summary update module 406, in a further embodiment, may provide the updated compatibility summary to each host adapter 108, such that each host adapter 108 has an accurate, current, compatibility summary. The summary update module 406 may provide the updated compatibility summary to each host adapter 108 in a similar manner as the status message module 402 described above, or the status message module 402 may provide the updated compatibility summary to each host adapter 108 for the summary update module 406.

Figure 5:
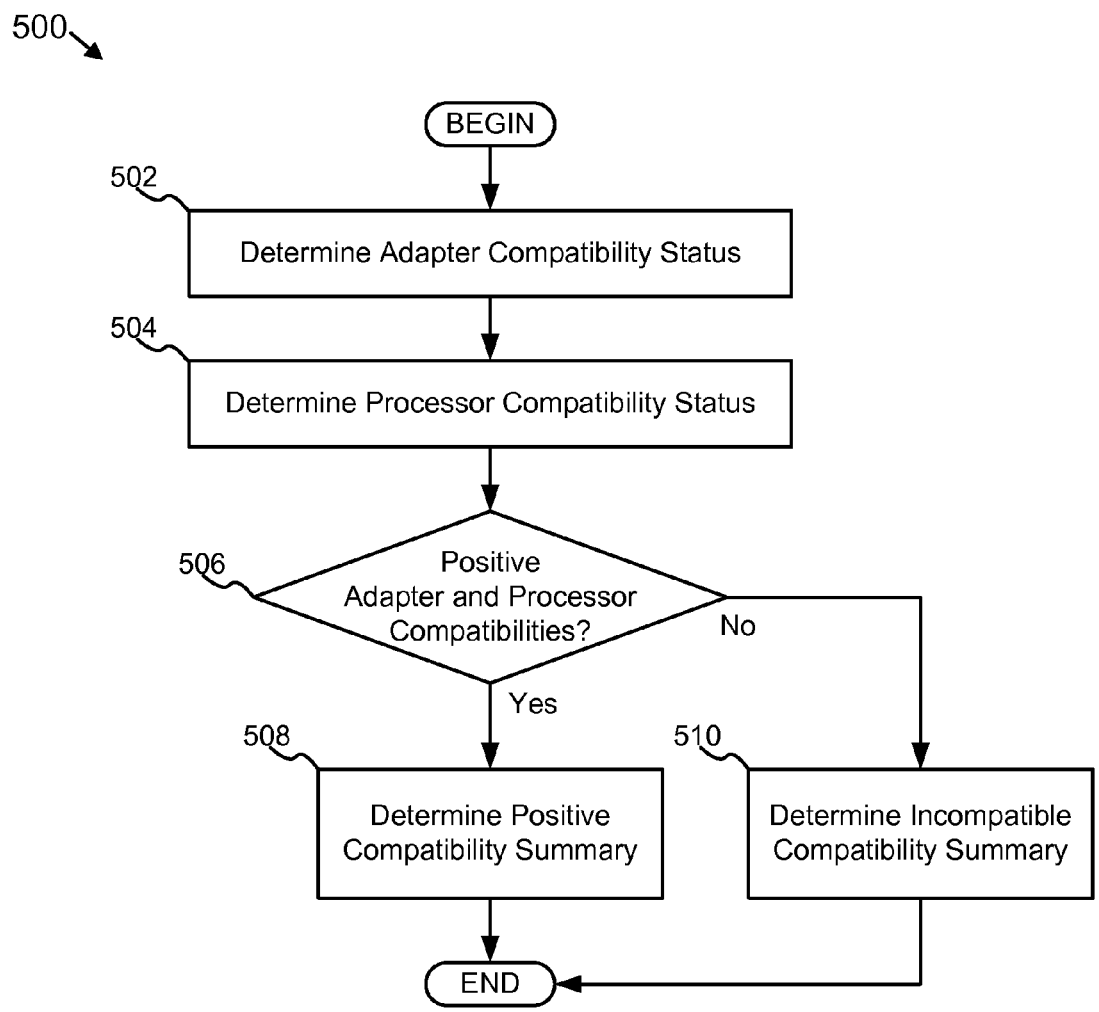
FIG. 5 is a schematic flow chart diagram illustrating one embodiment of a method for device level enablement of a communications protocol in accordance with the present invention.

FIG. 5 depicts one embodiment of a method 500 for device level enablement of a communications protocol. The method 500 begins, and the adapter compatibility module 302 determines 502 an adapter compatibility status for the plurality of host adapters 106 relative to the communications protocol. In one embodiment, a positive adapter compatibility status indicates that each host adapter 108 is compatible with the communications protocol.

The processor compatibility module 304 determines 504 a processor compatibility status for the one or more processors 110 relative to the communications protocol. As described above, the one or more processors 110, in one embodiment, may comprise one or more groups of processors 202, with individual processors or processor cores 112. The one or more processors 110 coordinate data transfers to and from the plurality of host adapters 106. In one embodiment, a positive processor compatibility status indicates that each processor 112 is compatible with the communications protocol.

The compatibility summary module 306 determines 506 whether or not the adapter compatibility status and the processor compatibility status both indicate positive compatibilities with the communications protocol. If the compatibility summary module 306 determines 506 that the adapter compatibility status and the processor compatibility status both indicate positive compatibilities with the communications protocol, the compatibility summary module 306 determines 508 a compatibility summary that indicates a positive compatibility with the communications protocol. If the compatibility summary module 306 determines 506 that either the adapter compatibility status or the processor compatibility status indicates an incompatibility with the communications protocol, the compatibility summary module 306 determines 510 a compatibility summary that indicates an incompatibility with the communications protocol, and the method 500 ends.

Figure 6:
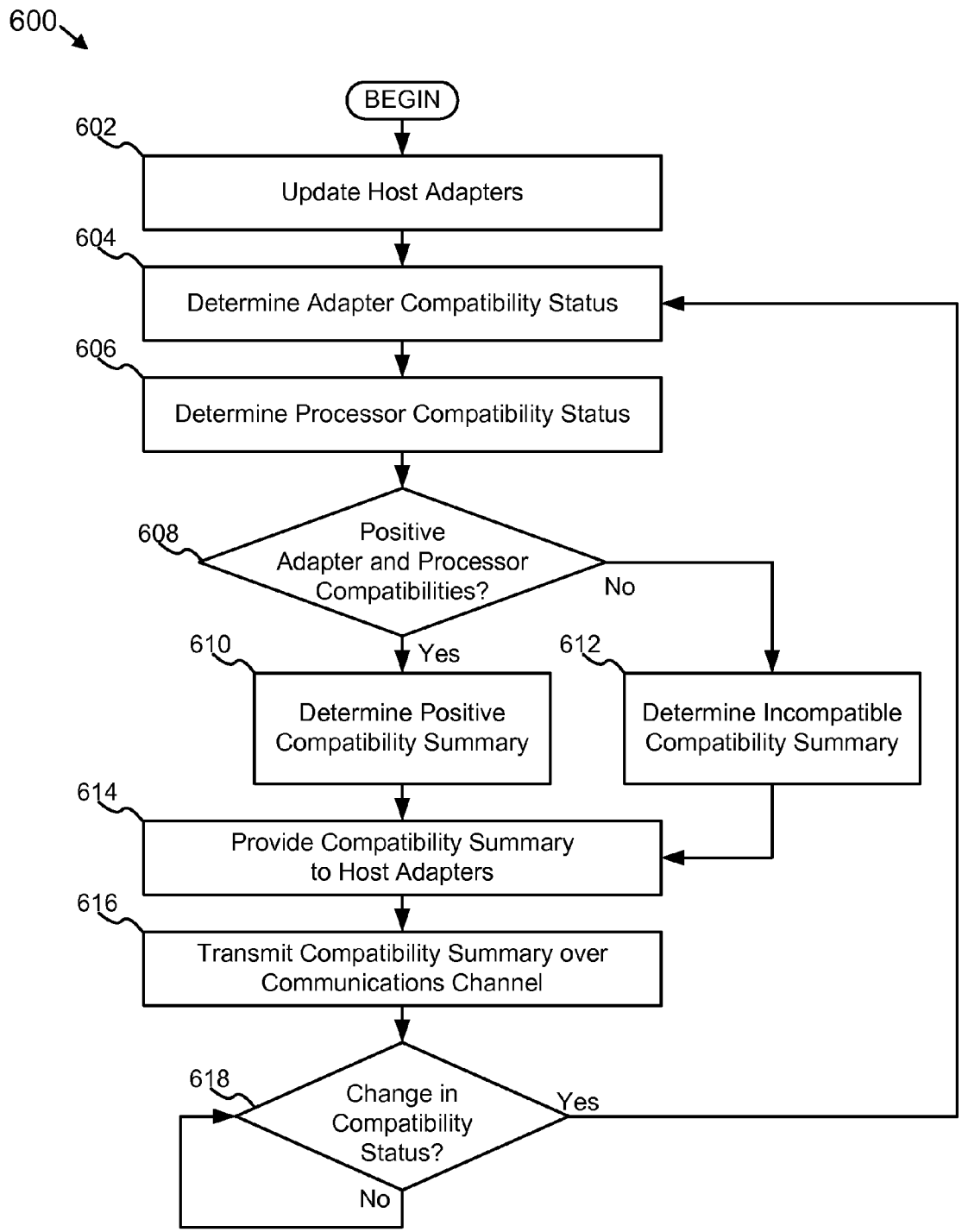
FIG. 6 is a schematic flow chart diagram illustrating another embodiment of a method for device level enablement of a communications protocol in accordance with the present invention.

FIG. 6 depicts one embodiment of a method 600 for device level enablement of a communications protocol. The method 600 begins, and the code update module 404 updates 602 one or more host adapters 108 and/or processors 112 with an update that is compatible with the communications protocol. The update 602 may be interrupted or incomplete, leading to one or more incompatible host adapters 108 and/or processors 112.

The adapter compatibility module 302 determines 604 an adapter compatibility status for the plurality of host adapters 106 relative to the communications protocol. In one embodiment, a positive adapter compatibility status indicates that each host adapter 108 is compatible with the communications protocol.

The processor compatibility module 304 determines 606 a processor compatibility status for the one or more processors 110 relative to the communications protocol. In one embodiment, a positive processor compatibility status indicates that each processor 112 is compatible with the communications protocol.

The compatibility summary module 306 determines 608 whether or not the adapter compatibility status and the processor compatibility status both indicate positive compatibilities with the communications protocol. If the compatibility summary module 306 determines 608 that the adapter compatibility status and the processor compatibility status both indicate positive compatibilities with the communications protocol, the compatibility summary module 306 determines 610 a compatibility summary that indicates a positive compatibility with the communications protocol. If the compatibility summary module 306 determines 608 that either the adapter compatibility status or the processor compatibility status indicates an incompatibility with the communications protocol, the compatibility summary module 306 determines 612 a compatibility summary that indicates an incompatibility with the communications protocol.

The status message module 402 provides 614 the compatibility summary to each host adapter 108. In one embodiment, the status message module 402 may provide 614 the compatibility summary to each host adapter 108, as described above, using an internal message processing and delivery system, using a PCI write operation, using a DMA write operation, or the like.

A host adapter 108 transmits 616 the compatibility summary to the communications device 102 over the communications channel 104. As described above, a host adapter 108, in one embodiment, may transmit 616 the compatibility summary to the communications device 102 during a handshake procedure, such as a PRLI handshake procedure or the like. A host adapter 108 may transmit 616 the compatibility summary to the communications device 102 in response to a request from the communications device 102, as part of a request from the host adapter 108 to the communications device 102, or the like.

The summary update module 406 determines 618 whether there is a change in either the adapter compatibility status or the processor compatibility status. If the summary update module 406 determines 618 that there is a change in either the adapter compatibility status or the processor compatibility status, the summary update module 406 updates the compatibility summary by returning the method 600 to the step of determining 604 the adapter compatibility status, and the method 600 continues from step 604 as described above. If the summary update module 406 determines 618 that there is no change in either the adapter compatibility status or the processor compatibility status, the method 600 remains on step 618, and the summary update module 406 continues to determine 618 whether there is a change in either the adapter compatibility status or the processor compatibility status.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for device level enablement of a communications protocol, the apparatus comprising:
   an adapter compatibility module configured to determine an adapter compatibility status for a plurality of host adapters, a positive adapter compatibility status indicating that each host adapter in the plurality of host adapters is compatible with a fibre channel protocol;
   a processor compatibility module configured to determine a processor compatibility status for one or more processors that coordinate data transfers to and from the plurality of host adapters, a positive processor compatibility status indicating that each of the one or more processors is compatible with the fibre channel protocol; and
   a compatibility summary module configured to determine a compatibility summary for the plurality of host adapters and the one or more processors, the compatibility summary indicating a positive compatibility relative to the fibre channel protocol in response to a positive processor compatibility status indicating that each of the one or more processors is compatible with the fibre channel protocol and a positive adapter compatibility status indicating that each host adapter in the plurality of host adapters is compatible with the fibre channel protocol;
   wherein the adapter compatibility module, the processor compatibility module, and the compatibility summary module comprise one or more of circuitry and executable code stored on a computer readable storage medium.

2. The apparatus of claim 1, further comprising a status message module configured to provide the compatibility summary to each host adapter in the plurality of host adapters, each of the plurality of host adapters configured to transmit the compatibility summary over a communications channel.

3. The apparatus of claim 2, wherein the status message module provides the compatibility summary to each host adapter in the plurality of host adapters using an internal message delivery system.

4. The apparatus of claim 2, wherein the status message module provides the compatibility summary to each host adapter in the plurality of host adapters using a peripheral component interconnect write operation that writes the compatibility summary to a host adapter.

5. The apparatus of claim 2, wherein the status message module provides the compatibility summary to each host adapter in the plurality of host adapters using a direct memory access write operation that writes the compatibility summary to a host adapter.

6. The apparatus of claim 1, further comprising a code update module configured to update one or more host adapters from the plurality of host adapters such that the one or more host adapters are compatible with the fibre channel protocol, the one or more host adapters further configured to report a positive compatibility with the fibre channel protocol to the adapter compatibility module in response to the update.

7. The apparatus of claim 1, further comprising a summary update module configured to update the compatibility summary in response to a change in the adapter compatibility status.

8. The apparatus of claim 7, wherein the change in the adapter compatibility status comprises an addition of a host adapter to the plurality of host adapters that is incompatible with the fibre channel protocol.

9. The apparatus of claim 1, wherein the compatibility summary comprises one or more compatibility flags.

10. The apparatus of claim 9, wherein each of the plurality of host adapters is configured to transmit the one or more compatibility flags over a communications channel during a handshake procedure.

11. The apparatus of claim 10, wherein the handshake procedure comprises a fibre process login procedure, and each of the plurality of host adapters are configured to transmit the one or more compatibility flags over the communications channel in a process login response.

12. The apparatus of claim 1, wherein the one or more processors comprise at least two groups of symmetric multiprocessors, each group of symmetric multiprocessors reporting a group compatibility status to the processor compatibility module.

13. The apparatus of claim 12, wherein each group of symmetric multiprocessors comprises a central electronic complex that coordinates data transfers between the plurality of host adapters and one or more data storage devices.

14. The apparatus of claim 1, wherein each host adapter in the plurality of host adapters comprises a fibre channel host adapter.

15. The apparatus of claim 14, wherein the fibre channel protocol comprises a fibre channel extension protocol that comprises an additional feature over an existing fibre channel protocol, and the communications channel comprises a fibre communications channel.

16. A system for device level enablement of a communications protocol, the system comprising:
   a plurality of host adapters, each host adapter configured to store a compatibility summary and to transmit the compatibility summary over a communications channel;
   one or more processors configured to coordinate data transfers to and from the plurality of host adapters;
   a protocol compatibility module comprising,
      an adapter compatibility module configured to determine an adapter compatibility status for the plurality of host adapters, a positive adapter compatibility status indicating that each host adapter in the plurality of host adapters is compatible with a fibre channel protocol;
      a processor compatibility module configured to determine a processor compatibility status for the one or more processors, a positive processor compatibility status indicating that each of the one or more processors is compatible with the fibre channel protocol; and
      a compatibility summary module configured to determine the compatibility summary for the plurality of host adapters and the one or more processors, the compatibility summary indicating a positive compatibility relative to the fibre channel protocol in response to a positive processor compatibility status indicating that each of the one or more processors is compatible with the fibre channel protocol and a positive adapter compatibility status indicating that each host adapter in the plurality of host adapters is compatible with the fibre channel protocol;

wherein the adapter compatibility module, the processor compatibility module, and the compatibility summary module comprise one or more of circuitry and executable code stored on a computer readable storage medium.

17. The system of claim 16, further comprising one or more data storage repositories, wherein the data transfers to and from the plurality of host adapters comprise data transfers between the one or more data storage repositories and the plurality of host adapters.

18. The system of claim 16, wherein the protocol compatibility module further comprises a status message module configured to provide the compatibility summary to each host adapter in the plurality of host adapters.

19. A computer program product comprising a non-transitory computer readable storage medium having computer usable program code executable to perform operations for device level enablement of a communications protocol, the operations of the computer program product comprising:

determining an adapter compatibility status for a plurality of host adapters, a positive adapter compatibility status indicating that each host adapter in the plurality of host adapters is compatible with a fibre channel protocol;

determining a processor compatibility status for one or more processors that coordinate data transfers to and from the plurality of host adapters, a positive processor compatibility status indicating that each of the one or more processors is compatible with the fibre channel protocol; and determining a compatibility summary for the plurality of host adapters and the one or more processors, the compatibility summary indicating a positive compatibility relative to the fibre channel protocol in response to a positive processor compatibility status indicating that each of the one or more processors is compatible with the fibre channel protocol and a positive adapter compatibility status indicating that each host adapter in the plurality of host adapters is compatible with the fibre channel protocol.

20. The computer program product of claim 19, further comprising providing the compatibility summary to each host adapter in the plurality of host adapters, each of the plurality of host adapters configured to transmit the compatibility summary over a communications channel.

21. The computer program product of claim 19, wherein each host adapter in the plurality of host adapters comprises a fibre channel host adapter and the one or more processors comprise at least two groups of symmetric multiprocessors, each group of symmetric multiprocessors reporting a group compatibility status to the processor compatibility module.

22. A method for device level enablement of a communications protocol, the method comprising:

determining an adapter compatibility status for a plurality of host adapters, a positive adapter compatibility status indicating that each host adapter in the plurality of host adapters is compatible with a fibre channel protocol;

determining a processor compatibility status for one or more processors that coordinate data transfers to and from the plurality of host adapters, a positive processor compatibility status indicating that each of the one or more processors is compatible with the fibre channel protocol; and determining a compatibility summary for the plurality of host adapters and the one or more processors, the compatibility summary indicating a positive compatibility relative to the fibre channel protocol in response to a positive processor compatibility status indicating that each of the one or more processors is compatible with the fibre channel protocol and a positive adapter compatibility status indicating that each host adapter in the plurality of host adapters is compatible with the fibre channel protocol;

wherein determining an adapter compatibility status, determining a processor compatibility status, and determining a compatibility summary are performed using circuitry.

23. The method of claim 22, further comprising providing the compatibility summary to each host adapter in the plurality of host adapters, each of the plurality of host adapters configured to transmit the compatibility summary over a communications channel.

24. The method of claim 22, wherein each host adapter in the plurality of host adapters comprises a fibre channel host adapter and the one or more processors comprise at least two groups of symmetric multiprocessors, each group of symmetric multiprocessors reporting a group compatibility status to the processor compatibility module.

25. A system for device level enablement of a communications protocol, the system comprising:

one or more data storage devices;

a plurality of fibre channel host adapters, each host adapter configured to store a compatibility flag and to transmit the compatibility flag over a fibre communications channel during a fibre process login handshake procedure;

one or more central electronic complexes, each central electronic complex comprising a plurality of processors configured to coordinate data transfers between the plurality of host adapters and the one or more data storage devices;

a protocol compatibility module comprising, an adapter compatibility module configured to determine an adapter compatibility status for the plurality of host adapters, a positive adapter compatibility status indicating that each host adapter in the plurality of host adapters is compatible with a fibre channel extension protocol;

a processor compatibility module configured to determine a processor compatibility status for each of the one or more central electronic complexes, a positive processor compatibility status indicating that each processor from a central electronic complex is compatible with the fibre channel extension protocol; and a compatibility summary module configured to determine the compatibility flag for the plurality of host adapters and the one or more central electronic complexes, the compatibility flag indicating a positive compatibility relative to the fibre channel extension protocol in response to a positive compatibility status indicating that each of the one or more processors is compatible with the fibre channel extension protocol and a positive adapter compatibility status indicating that each host adapter in the plurality of host adapters is compatible with the fibre channel extension protocol;

wherein the adapter compatibility module, the processor compatibility module, and the compatibility summary module comprise one or more of circuitry and executable code stored on a computer readable storage medium.

* * * * *